Nov. 25, 1969      L. G. KILMER      3,480,103

METHOD OF GENERATING REPETITIVE SEISMIC SHOCK WAVES

Original Filed Nov. 17, 1966

INVENTOR.
LAUREN G. KILMER

BY

McLean, Morton and Boustead

ATTORNEYS

United States Patent Office 3,480,103
Patented Nov. 25, 1969

3,480,103
METHOD OF GENERATING REPETITIVE SEISMIC SHOCK WAVES
Lauren G. Kilmer, Tulsa, Okla., assignor to Sinclair Research, Inc., New York, N.Y., a corporation of Delaware
Continuation of application Ser. No. 595,135, Nov. 17, 1966. This application Aug. 9, 1968, Ser. No. 781,642
Int. Cl. G01v *1/00, 1/16*
U.S. Cl. 181—.5                                         9 Claims

ABSTRACT OF THE DISCLOSURE

A method for injecting into the ground a continuous seismic signal made up of repetitive shock waves having a predetermined repetition rate utilizing a gas exploder having an explosion chamber formed of a rigid top, a rigid bottom, and an extensible side wall and including inlet means for a fuel gas and an oxidizing gas, spark means, and exhaust means for exhausting said chamber comprising the steps of injecting a combustible mixture of a fuel gas and an oxidizing gas into said chamber through said inlet means; actuating said spark means at said repetition rate to ignite said mixture whereby a high pressure wave is created; passing the shock wave to said inlet means to inhibit the injection of said fuel gas and said oxidizing gas; and rapidly venting said chamber.

---

Figure 1:
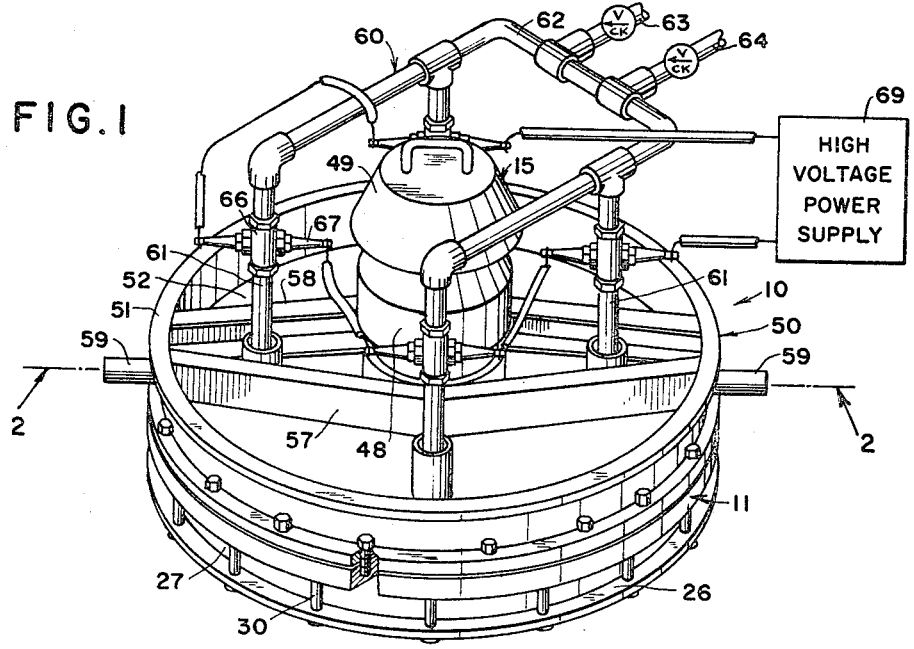

This application is a continuation of United States patent application Ser. No. 595,135, filed Nov. 17, 1966 and now abandoned.

This invention relates to geophysical prospecting and in particular to a method for imparting a seismic impulse at the earth's surface utilizing a gas exploder actuated by repetitive explosions.

As described in the co-pending Kilmer application Ser. No. 314,230, filed Oct. 7, 1963, now United States Patent No. 3,314,497, a gas explosion confined in an expansible chamber acting at the earth-air interface against a large mass positioned above such gas explosion can be utilized to impart a compressive impulse to the surface of the earth beneath the gas explosion thereby initiating a seismic wave. If the explosion is confined in a device having a rigid top (carrying the weight of the large mass) and rigid bottom with vertically extensible sidewalls, the seismic wave generated is useful for seismic prospecting by refraction and reflection techniques, since the impulse imparted to the surface of the earth has a high energy content and can be made of extremely short duration.

It has now been discovered that such a device is also adaptable to, for example, produce a continuous seismic signal by rapid ignition and re-ignition of the combustible gas mixture in the explosion or combustion chamber and, in accordance with this invention, the gas charging system for the exploder is constructed such that pure gases, i.e. fuel gas such as propane, propylene, acetylene, etc., and oxidizing gas such as oxygen, etc., are conducted as unmixed gases to the point of release into the manifold for the system. In operation, the gases are then mixed and allowed to flow at full volume into the explosion chamber and the mixture is then ignited, for example, by the spark gap in the time sequence desired to produce the continuous signal, except that when large volumes of gas are flowing, it is advisable to pulse the system at short intervals to prevent the accumulation of slugs which are too large for the system to accommodate or that do not fit a pattern of pulses which may follow. A check valve can be incorporated into each of the gas supply lines to prevent fire from going back thereinto if desired, however, that part of the detonation wave which follows ignition of the mixed gases at the spark gap travels in two directions, one of which is back into the gas charging system where mixed combustible gases are being injected. This wave has very high pressure and the combustion wave which follows it also has high pressure and together they temporarily stop the flow of mixed gases into the mixing zone, and in fact, reverse the flow and at times cause a wave of incandescent gas to go into the gas charging system. At the same instant, another part, or direction, of the detonation wave ignites the gas in the explosion chamber and sends out a compressional wave through the movable bottom plate and into the ground.

The exploder of this invention includes an exhaust system which rapidly opens and allows the hot, high-pressure gas which is present in the explosion chamber after each detonation to escape. The gas which remains in the chamber after the rapid exhaust cools and the expandable sidewalls of the chamber retract so that the pressure in the chamber is reduced, i.e. to below atmospheric pressure. This reduction in pressure assists in the flow of fresh gases into the explosion chamber but a short time is required before the gases mix enough to form a combustible mixture. During the interval while the gases are reversing flow and have a barrier of noncombustible gases between them and the previously burned and burning gases, there cannot be a continuation of ignition across the barrier since a combustible mixture does not exist. This allows the unrestricted flow of gases and timed ignition pulses, which are desirable for seismic work. The ignition pulses are also timed to correlate with the movement of the sidewalls of the explosion chamber since it is undesirable to re-ignite the gases in the chamber after one ignition until the chamber is reformed. In general, any of the fuel and oxidizing gases commonly used in seismic gas exploders can be used; however, preferably the fuel gas used is one which will give a fast detonation wave to assure that the first cannot carry over between two ignitions.

Figure 2:
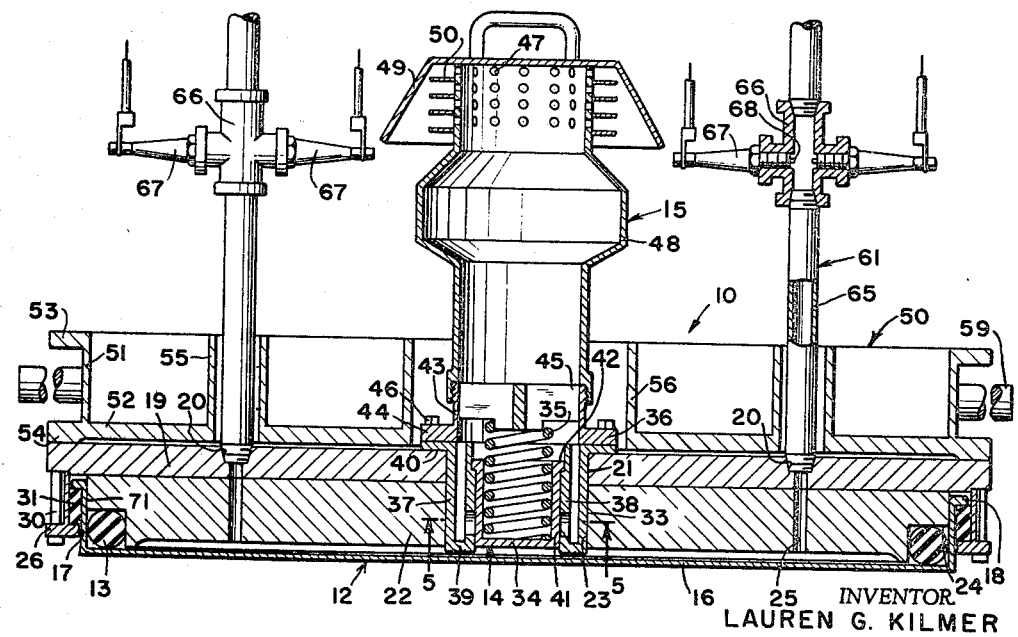

For a more complete understanding of the practical application of this invention reference is made to the appended drawings in which:

FIGURE 1 is an isometric view of a gas exploder constructed in accordance with my present invention; and, FIGURE 2 is a vertical section taken at line 2—2 in FIGURE 1.

The reference number 10 designates a gas exploder constructed in accordance with this present invention. Gas exploder 10 basically includes a top 11, a bottom 12, a sealing ring 13, a valve 14 and an exhaust stack 15. Bottom 12 includes a circular steel plate 16 having at its rim an upstanding cylindrical flange 17. Flange 17 carries an outwardly-extending, short, annular flange 18 at its upper end.

Top 11 includes an annular, thick-steel plate 19 having an outside diameter slightly larger than the outside diameter of flange 18 and is further provided with four small, tapped vertical openings 20 disposed at 90° intervals about plate 19 approximately midway between its central opening 21 and its rim. Plate 19 carries a depending, coaxially positioned generally annular, iron casting 22 which is welded to the underside of plate 19. Casting 22 is approximately of the same height as flange 17 on bottom plate 16 and has an outside diameter slightly less than that of flange 17 such that top plate 19 can be positioned coaxially over bottom plate 16 with casting 22 inside flange 17 and spaced slightly inward of flange 17. Of course, if desired, plate 19 and casting 22 can be integral. Casting 22 has an open center 23 approximately the same diameter as opening 21 and is stepped inwardly at its lower, outer edge to form an annular seat 24 sized to receive O-ring 13. Casting 22 is further provided with four vertical passages 25 which are disposed at 90° intervals about casting 22 and are positioned such that they coincide in location with tapped openings 20 in plate 19 with which they register. Sealing ring 13, which is made of chloroprene rubber, is positioned resting on the top of bottom plate 16 just inside flange 17 such that seat 24 rests on it. Preferably the thickness of ring 13 is sufficient that the bottom of casting 22 slightly clears the top of bottom plate 16 and the sides of ring 13 are just tangent to the side of casting 22 below seat 24 and the inner side of flange 17.

Bottom 11 and top 12 are retained together by means of a hoop 26 positioned encircling flanges 17 and 18. Hoop 26 is secured to the underside of the rim of plate 19 by means of a series of cap bolts 30 which extend upwardly through apertures disposed at intervals about hoop 26 with their shank ends threadedly received in correspondingly positioned tapped openings in the underside of the rim of plate 19 to hold hoop 26 firmly against the underside of plate 19. The inside diameter of the cylindrical portion of hoop 26 is sized just to clear flange 18 on bottom 12 such that the lower end of hoop 26 is spaced below and underlies flange 18 to receive a ring 31 of hard chloroprene rubber between hoop 26 and flange 17. Ring 31 has cross-sectional dimensions generally filling the space between the cylindrical portion 27 on hoop 26 and flange 18.

Valve 14 includes a valve body 33, a piston (valve element) 34, a helical spring 35 and a spring retainer cage 36. Generally valve body 33 includes a pair of coaxial cylindrical walls 37 and 38, which are spaced from each other, and closed together at their lower ends by means of an interconnecting annular end wall 39 and are open at their upper ends. The outer sidewall 37 at its upper end is provided with an outwardly extending annular flange 40 and itself has a diameter just less than that of openings 21 and 23 such that valve body 33 can be positioned in openings 21 and 23 with flange 40 overlying the top of plate 19. Inner wall 38 has a machined inside surface which is counter-sunk at its upper end and which is provided with a series of apertures 41 adjacent its lower end providing communication between the annular space between walls 37 and 38 and the central opening of valve body 33 lying inside wall 38.

Piston 34 is a machined casting sized to fit snugly but slidingly within cylindrical wall 38 and has a flange 42 at its upper end received in the counter bore in the upper end of the interior of wall 38 to limit downward movement of piston 34 at a position in which the lower, closed end of piston 34 is flush with the underside of casting 22 when piston 34 is dropped into the central opening of valve body 33 from its upper ends.

Spring cage 36 is a short steel cylinder 43 which is threaded at its upper end and which has an outwardly projecting, annular flange 44 at its lower end and a pair of intersecting steel cross-plates in its upper interior portion forming a spider 45. The cylindrical portion 43 of spring cage 36 has the same inside diameter at sidewall 37 of valve body 33 and is positioned above valve body 33 with annular flange 44 on spring cage 36 overlying flange 40. Spring cage 36 is retained in such position by a series of cap bolts 46 received in apertures in flanges 40 and 44 which register with correspondingly disposed tapped bores about opening 21 in plate 19 such that helical spring 35 is retained snugly under compression between the underside of spider 45 and the upperside of the closed bottom of piston 34. The spacing of the flights of spring 35 in this position and the length of piston 34 in relation to the location of spider 45 is such that when piston 34 is displaced upwardly to the maximum compression of spring 35, apertures 41 in sidewall 38 are completely exposed to communicate the space confined between bottom 12 and top 11 with the annular space between walls 37 and 38 of valve body 33 and hence with the exterior of exploder 10 through spring cage 36.

Muffler 15, which is of any conventional construction providing low-pass characteristics desirably having an upper cut-off frequency on the order of five cycles per second, is threadedly received at its open, lower end on the upper end of cylinder 43 of spring cage 36 and is provided with lateral openings 47 about its upper, closed end to permit venting of gases passing upwardly through valve 14 into muffler 15. Interiorly muffler 15 is hollow, in the illustrated case, and is centrally enlarged as indicated by the reference numeral 48. A frusto-conical deflector skirt 49 is mounted at the upper end of muffler 15 above opening 47 and extends downwardly and outwardly to below the level of opening 47. Optionally opening 47 can be disposed in several rows about the top of muffler 15 underlying deflector skirt 49, and the upper end of muffler 15 can be further provided with external annular baffles 50' positioned within deflector skirt 49 and spaced inwardly therefrom, each such baffle 50' being attached to muffler 15 between an adjacent pair of rows of opening 47.

It will be noted gas exploder 10 can be, although it is not necessarily, further equipped with a shallow cylindrical tank 50 including, as integral parts, a cylindrical sidewall 51, an annular bottom plate 52, outwardly extending, annular flanges 53 and 54 at the upper and lower ends of sidewall 51 respectively, and four upstanding sleeves 55 having their lower ends disposed in openings in plate 52 registering with openings 20 but having wider diameters than openings 20. In addition the central aperture of plate 52, which is wider than flanges 40 and 44 on valve body 33 and spring cage 36, is also provided with an integral, upstanding sleeve 56 the lower end of which is disposed in such central aperture. Tank 50 is further provided with a pair of slightly bowed braces 57 and 58 which are in juxtaposition with their adjacent end pairs close and welded to the inside of sidewall 51 and with their centers bowed away from each other with sleeve 56 between them.

Exteriorly tank 50 is provided at diametrically opposite positions in its sidewall 51 with a pair of outwardly extending stub shafts 59 which are secured to sidewall 51, each adjacent one pair of adjacent end of braces 57 and 58. Stub shafts 59 can be used for carrying gas exploder 10 in a fork-type device. If desired, tank 50 can retain a lead casting within sidewall 51 for extra weight. In such case sleeves 55 and sleeve 56 serve to provide access to openings 20 and to valve 14.

Gas exploder 10 further requires a gas charging and ignition system generally designated by the reference number 60. Charging and ignition system 60 basically includes four upstanding conduits 61 interconnected at their upper ends through a header 62 to separate valve connections 63 and 64 which for example might be check valves leading to storage cylinders respectively for propylene, or other suitable combustible gas, and for oxygen.

Each upstanding conduit 61 includes a pipe section 65 threadedly received at its lower end in a tapped aperture 20 in plate 19 and, threadedly received on the upper end of such pipe section 61, a four-way fitting 66. Header 62 generally includes suitable nipples, elbows and T's as well as pipe sections to provide a U-shaped connection communicating the upper openings of four-way fittings 66 with valved conduits 63 and 64 which are preferably connected to the bottom of the U.

Eight spark plugs 67 having their ground electrodes removed are connected, two to each four-way fitting 66, in the lateral openings of fittings 66 such that, as shown most clearly in FIGURE 2, the insulated electrodes 68 of each thusly associated pair of plugs 67 face each other in such fitting 66. Exteriorly eight spark plugs 67, thus mounted, are electrically connected in series to a suitable electrical supply 69 which is capable of impressing a high voltage, typically on the order of 70,000 volts, across serially interconnected spark plugs 67 at any desired instant in time.

In operation gas exploder 10 is located at a suitable location with bottom 12 resting on the ground at a spot clear of large stones and other undesirable structure. Typically spring 35 is under sufficient compression such that operation of piston 34 does not occur until a pressure within exploder 10 on the order of 30 p.s.i.g. has been reached.

Valved conduits 63 and 64 are then opened to permit fuel gas, e.g. propylene, and oxidizing gas, e.g. oxygen, to flow continuously at full volume into the explosion chamber. The mixture in the chamber is ignited at the desired time sequence by actuating high voltage source 69 at the desired time sequence to place a high potential across the serial connection of the eight spark plugs 67, i.e. provide a spark pulsed at the time sequence. As the gases are exploded in chamber A, subsequent to the initial shock wave of the explosion which creates the seismic wave of interest, the continued expansion of the exploding gases drives the weight of top 11 and its associated equipment upwardly relative to bottom 12. At such time the pressure of the exploding gases forces sealing ring 13 tightly against the joint formed between the flange 17 and casting 22, generally deforming ring 13 against such joint and at the same time lifting ring 13 with the rising structure supported on and by plate 19. At the same time as relative movement of the bottom 12 and top 11 occurs, however, piston 34 is lifted at even faster rate to vent the interior of gas exploder 10 through valve 14 and muffler 15. This vent action is so rapid that normally the pressure is relieved and top 11 again collapses on bottom 12 within a fraction of a second.

The shock or detonation wave which follows an ignition, e.g. spark, travels in two directions. One such direction of wave travel is back in the manifold to where mixed combustible gases are being injected. The wave here has very high pressure and the combustion wave which follows also has high pressure. Together they temporarily stop the flow of mixed gases into the manifold; and, in fact, reverse the flow causing a wave of incandescent gas to go into the injector. At the same instant the detonation wave also passes down the manifold to ignite the gas in the explosion chamber and sent out a compressional wave through the movable bottom plate into the ground.

The exhaust system in opening allows the hot, high-pressure gas to escape and the gas which remains in the chamber cools by expansion and radiation. As the pressure pulse produced by an ignition of the gases passes, the pressure in chamber A and the manifold is reduced and the gases again flow into the manifold. It, however, requires a short time before the gases mix enough to become a combustible mixture. During the interval while the gases are reversing flow and have a barrier of non-combustible gases between them and the previously burned and burning gases, there cannot be a continuation of ignition across the barrier. This allows the unrestricted flow of gases and timed ignition pulses, which are desirable for seismic work.

Since the energy produced by the exploder in accordance with this invention will cause the exploder to rise off the ground and chamber A to expand, the energy produced by each detonation is preferably maintained below the energy level at which the exploder is raised to a point such that it cannot fall to rest, and chamber A collapses, before ignition of the succeeding detonation.

The spark plugs 67 can be pulsed by any suitable mechanism or distributor such as an automobile breaker system and coil to provide a pulse of the desired frequency or repetition rate, e.g. of 1 to 100 cycles per second. The frequency can be constant or can vary over a period of time such as varying from 10 to 80 cycles per second over a four second period, e.g. at ten cycle intervals for each half sec.

To illustrate the method of this invention, an exploder using an automobile breaker system and coil pulsing the electrical source, with the breaker driven by a variable speed device, has been operated to give pulsed seismic signals at frequencies of up to 50 cycles per second. The fuel was propylene and the oxidizing gas was oxygen which flowed at a rate of ½ cu. ft. in four seconds. A stoichiometric amount of propylene was injected.

It is claimed:
1. A method of generating a series of compression pulses in the ground at a high repetition rate utilizing a gas exploder with a closed combustion chamber including a rigid bottom plate and a pressure-operative venting means, said method comprising:
   (a) placing said rigid bottom plate into direct contact with the ground;
   (b) passing a fuel gas through a first inlet in a first direction into a mixing chamber;
   (c) passing an oxidizing gas through a second inlet in a first direction into said mixing chamber;
   (d) mixing said fuel gas and said oxidizing gas within said mixing chamber;
   (e) passing the mixed gases from the mixing chamber into said combustion chamber;
   (f) igniting the mixed gases within said combustion chamber to form high temperature, high pressure gas causing a shock wave;
   (g) applying at least a portion of the shock wave against said rigid bottom plate to create a compression pulse in the ground;
   (h) passing at least a portion of the shock wave to said mixing chamber to force fuel gas through said first inlet in a second direction and to force oxidizing gas through said second inlet in a second direction, thereby insuring termination of combustion;
   (i) passing at least a portion of the shock wave to said venting means to rapidly vent the majority of said high temperature, high pressure gas from said combustion chamber and said mixing chamber;
   (j) cooling the remaining high temperature gas within said combustion chamber and said mixing chamber; and
   (k) repeating steps (b) through (j) at said repetition rate.

2. The method of claim 1 wherein said repetition rate is up to 100 cycles per second.

3. The method of claim 1 wherein said repetition rate is up to 50 cycles per second.

4. The method of claim 1 wherein said repetition rate is constant.

5. The method of claim 1 wherein said repetition rate varies with respect to time.

6. The method of claim 1 wherein the oxidizing gas is pure oxygen.

7. A method of operating apparatus for generating a series of compression pulses in the ground at a high repetition rate utilizing a gas exploder with a closed combustion chamber including a spark gap type ignition means, a rigid bottom plate and a pressure-operative venting means, said method comprising:
   (a) placing said rigid bottom plate into direct contact with the ground;
   (b) passing a fuel gas through a first check-valve-controlled inlet in a first direction into a mixing chamber;
   (c) passing an oxidizing gas through a second check-valve-controlled inlet in a first direction into said mixing chamber, thereby to provide a mixing of said fuel gas and said oxidizing gas within said mixing chamber and a subsequent passing of the mixed gases from the mixing chamber into said combustion chamber;
   (d) actuating said ignition means to ignite the mixed gases within said combustion chamber to form high temperature, high pressure gas causing a shock wave, whereby at least a first portion of the shock wave is applied against said rigid bottom plate to create a compression pulse in the ground, and whereby at least a second portion of the shock wave is passed to said mixing chamber to force fuel gas through said first inlet in a second direction and to force oxidizing gas through said second inlet in a second direction, thereby insuring termination of combustion, and further whereby at least a third portion of the shock wave is passed to said venting means to rapidly vent the majority of said high temperature, high pressure gas from said combustion chamber and said mixing chamber;

(e) permitting the cooling of the remaining high temperature gas within said combustion chamber and said mixing chamber; and (f) repeating steps (b) through (e) at said repetition rate.

8. The method of claim 7 wherein said repetition rate is constant.

9. The method of claim 7 wherein said repetition rate varies with respect to time.

References Cited

UNITED STATES PATENTS

| 2,994,397 | 8/1961 | Huckabay | 181—.5 |
| 3,260,327 | 7/1966 | McCollum | 181—.5 |
| 3,292,140 | 12/1966 | Angona et al. | |

FOREIGN PATENTS 716,169   9/1954   Great Britain.

BENJAMIN A. BORCHELT, Primary Examiner

T. H. WEBB, Assistant Examiner

U.S. Cl. X.R.

340—17